United States Patent [19]
Petty et al.

[11] Patent Number: 6,129,843
[45] Date of Patent: Oct. 10, 2000

[54] DEVICE FOR THE REMOVAL AND CONCENTRATION OF NEUTRAL MERCURY SPECIES FROM AND WATER

[75] Inventors: Jimmie D. Petty; William G. Brumbaugh; James N. Huckins; Thomas W. May, all of Columbia, Mo.

[73] Assignee: The United States of America as represented by the Secretary of the Interior, Washington, D.C.

[21] Appl. No.: 09/195,039

[22] Filed: Nov. 19, 1998

[51] Int. Cl.⁷ .................................................. B01D 63/06
[52] U.S. Cl. ............................. 210/321.78; 210/321.87; 210/644; 210/638; 423/109; 96/4
[58] Field of Search .................... 210/500.36, 500.25, 210/643, 651, 500.23, 669, 634, 644, 641, 321.78, 321.87, 638; 95/44, 46; 423/210, 100, 109; 96/4; 75/388, 121

[56] References Cited

U.S. PATENT DOCUMENTS

| | | | |
|---|---|---|---|
| 3,785,803 | 1/1974 | Moore | 75/121 |
| 4,092,117 | 5/1978 | Byrne . | |
| 4,364,775 | 12/1982 | Starkovich | 423/109 |
| 4,891,137 | 1/1990 | Nohl et al. | 210/644 |
| 4,992,207 | 2/1991 | Darnall et al. | 423/100 |
| 5,173,286 | 12/1992 | Audeh | 423/210 |
| 5,209,773 | 5/1993 | Audhe et al. | 75/388 |
| 5,254,143 | 10/1993 | Anazawa et al. | 95/46 |
| 5,437,797 | 8/1995 | Helmig | 210/669 |
| 5,492,627 | 2/1996 | Hagen et al. | 210/651 |
| 5,558,771 | 9/1996 | Hagen et al. | 210/500.25 |
| 5,868,935 | 2/1999 | Sirkar et al. | 210/643 |
| 5,872,257 | 2/1999 | Beckman | 210/634 |

*Primary Examiner*—Ana Fortuna
*Attorney, Agent, or Firm*—E. Philip Koltos

[57] ABSTRACT

A device is provided for removing and concentrating neutral mercury species from air and water. The device includes a nonporous polymeric membrane, preferably in the form of a flattened tube, for capturing and removing the neutral mercury species from the environment and a sequestration medium contained within the tube for transforming the neutral mercury species captured by the tube into a stabilized mercury species. The sequestration medium can comprise an acidic oxidant for transforming the neutral mercury species into a ionic soluble mercury species or a complexing agent for transforming the mercury species into a complexed soluble mercury species. The nonporous membrane can be made of a number of different synthetic polymers including polyethylene. The device is ideally suited for the passive integrative sequestration of neutral mercury species from a wide variety of environments.

22 Claims, 1 Drawing Sheet

DEVICE FOR THE REMOVAL AND CONCENTRATION OF NEUTRAL MERCURY SPECIES FROM AND WATER

FIELD OF THE INVENTION

The present invention relates to devices for capturing and removing neutral mercury species from the air and/or from water and for concentrating the mercury for analysis and other purposes.

BACKGROUND OF THE INVENTION

Global emissions of mercury into the atmosphere have increased by an estimated factor of three over the past 100 years due primarily to anthropogenic releases associated with fossil fuel burning and waste incineration (particularly municipal waste). Closely associated with the increases in atmospheric mercury emissions are widespread increases in the concentrations of mercury in fish tissue, even in remote bodies of water far removed from any direct input source. Fish and other aquatic organisms have been demonstrated to be highly efficient at bioconcentrating mercury from water, and this poses a serious health risk to consumers. In addition, food chains based on aquatic organisms can lead to mercury contamination of birds and mammals. Vapor phase transport of mercury through the global environment is of great concern due to increasing energy production and industrial activity worldwide. Accordingly, monitoring of vapor phase mercury in the atmosphere and neutral mercury species dissolved in the aqueous phase of environmental systems, together with remediation of mercury contamination, will become increasingly critical for the foreseeable future.

Laboratories conducting analytical and toxicological research, concerning the presence and toxicity of mercury species, must have facilities that are practically free of vapor-phase mercury (i.e., clean at ultra-trace levels) so as to avoid false-positive results, i.e., results indicating that mercury was present in a sample, or that mercury caused a demonstrated effect, when, in fact, the mercury came from the laboratory environment. To ensure that laboratory contamination of samples by vapor-phase mercury is not a problem, a simple and effective integrative way is needed for monitoring air and water at very low levels for vapor and dissolved phase-neutral mercury species. Unfortunately, current methods are not integrative over sufficient time intervals to sequester adequate amounts of ultra-trace levels of vapor-phase mercury and to cost effectively detect episodic releases.

Currently, there are two basic approaches for sampling vapor-phase neutral mercury species: 1) using a pump to pass a known volume of air through a trap designed for collection of vapor-phase mercury (wherein, the trap typically is comprised of an inert substrate coated with gold), and 2) passive diffusive sampling into an adsorbent or gold film. With the "pump and trap" methods, the analysis can be performed in a semi-continuous manner (on site) or by a "grab sampling" approach wherein the trapped vapor-phase mercury is taken to the laboratory for analysis. These active sampling approaches suffer from the adverse consequences of potential instability (i.e., loss of adsorbed mercury through revaporization, etc.), complexity, and mechanical operation with its attendant requirement for power sources, flow rate calibration, and human oversight. Further, the presence of particulate matter in the sampled media often interferes with the sampling process. For example, as particulate matter is deposited on the sampling surface or in, or on, a prefilter media, the particulate matter acts as an additional filtration matrix with the potential of reducing flow rates through the sampling system. Further, the retained particulate matter may sorb the mercury species at a rate significantly greater than the original filter, thereby resulting in imprecise or biased mercury values.

There are two passive badge-type samplers used for vapor phase mercury. One version utilizes a thin film of gold as described in U.S. Pat. No. 3,942,219 (Brum) and in McCammon, C. S. jr. and Woodfin, J. W., An Evaluation of a Passive Monitor for Mercury Vapor, Am. Ind. Hyg. Assoc., 1997, 38, 378–386. The second uses a metal oxide solid sorbent as described in Rathije, A. O. and Marcero, D. H., Improved Hopcalite procedure for the Determination of Mercury Vapor in the Air by Flameless Atomic Absorption, Am. Ind. Hyg. Assoc. 1976, 37, 311–314. Each sampler uses a microporous membrane barrier through which mercury vapor diffuses across air filled regions to the sampling cartridge. For the gold film approach, the detection of sorbed (amalgamated) mercury is based on an electrical measure of the change in the resistivity of the gold imparted by traces of amalgamated mercury. This approach is subject to poor detection limits and the potential for interference from oxidizing agents such as chlorine gas. For the sorbent based system, potentially high background levels of mercury (and the resulting poor detection levels), resulting from the strong acid treatment required to recover the sorbed mercury prior to analysis by spectroscopic methods, present problems. No passive sampling methods for gaseous mercury dissolved in water have been demonstrated. The determination of gaseous mercury in water is accomplished using a purge and trap system employing an inert gas as the purging media and a sorbent to trap the vapor-phase mercury.

Other patents of interest in the general field include the following: U.S. Pat. Nos. 5,492,627 (Hagen, et al.); U.S. Pat. No. 5,558,771 (Hagen, et al.); U.S. Pat. No. 4,364,775 (Starkovich); U.S. Pat. No. 4,094,669 (Balko, et al.); U.S. Pat. No. 4,950,408 (Duisters, et al.); U.S. Pat. No. 5,209,773 (Audeh, et al.); U.S. Pat. No. 5,173,286 (Audeh) and U.S. Pat. No. 5,437,797 (Helmig). Briefly considering these patents, the Hagen, et al. patents disclose a porous support and web that filters out the mercury (elemental, ionic, or organic) from a fluid stream (column 2, lines 10–11). The porous web can be made from a polyamide, polytetrafluoroethylene, or a polyolefin (column 2, line 24–26). The support is coated with gold or a tin-salt which amalgamates the mercury and thus separates the mercury out from the fluid. The Starkovich patent discloses a process that removes mercury from a solid substrate by exposing the substrate to an oxidant containing compound (column 3, line 12). Examples of oxidants include nitric acid and potassium permanganate (see table I). The Balko, et al. patent discloses the filtering of mercury by first precipitating the mercury as mercury sulfide, then reacting the mercury sulfide with an oxidant and reducing the mercury to a metallic state with a reducing agent. The metallic mercury is then collected on a filter (column 1, lines 55–56). The Duisters, et al. patent discloses, in reference to the prior art, a process for mercury removal using an oxidizing agent (column 1, line 47). The Duisters patent removes mercury by using an active thiol-group (e.g., di-thiocarbamic acid) to absorb ionic (oxidized) mercury. The Audeh ('286) patent discloses a trap for trapping elemental mercury in a source deposit so that the mercury does not leak into the environment. Mercury-containing deposits are treated with inorganic sulfur compounds such as sulfides, alkali metal thiosulfates, and alkali metal which convert the soluble mercury to insoluble mercury and keep the mercury from "leaking" out of the deposit (column 1, lines 50–58). The Audeh ('773) patent discloses a guardbed that removes mercury from a gaseous stream. The guardbed contains two porous substrates that are coated with a mercury amalgamable material such as gold, silver or mixtures thereof (column 4, line 20). Any mercury that passes over this material amalgamates on the substrate and is removed. The Helmig patent discloses a process where organic and inorganic mercury is removed by passing a mercury containing aqueous stream through a macroporous cross-linked polystyrene chelating resin containing a polyisothiouronium functional group (column 4, lines 35–39).

SUMMARY OF THE INVENTION

According to the invention, an improved device is provided for capturing neutral mercury species and concentrating the species for analysis and the like. The device is simpler than prior art devices, and is more reliable than these devices because, inter alia, the device of the invention is not subject to mechanical problems or breakdowns. The device of the invention provides improved analytical precision for measurements of neutral mercury residues, improved detection limits for these residues, and wider applicability. In the latter regard, the device is particularly suitable for use in remote unattended situations. Moreover, all of these advantages, as well as others discussed below, are provided at substantially reduced costs as compared with prior art devices.

In accordance with the invention, a device is provided for removing and concentrating neutral mercury species from air and water, the device comprising: a nonporous polymeric membrane for capturing the neutral mercury species; and a sequestration medium carried by the membrane for transforming the neutral mercury species captured by the membrane into a stabilized, soluble mercury species.

In one preferred embodiment, the sequestration media comprises an oxidant for transforming the neutral species into a ionic soluble mercury species. Preferably, the oxidant comprises an acidic oxidant selected from the group consisting of nitric acid, hydrochloric acid, nitric acid and gold mixtures, hydrochloric acid and gold mixtures; potassium permanganate and surfuric acid mixtures, and nitric acid and hydrochloric acid mixtures. Advantageously, the acidic oxidant comprises nitric acid and in another important implementation, the oxidant comprises nitric acid augmented with soluble gold in the +3 valence state. In another important implementation, the oxidant comprises hydrochloric acid augmented with gold in the +3 valence state.

In another embodiment, the sequestration medium comprises a complexing agent for transforming the mercury species into a complexed soluble mercury species. Preferably, the sequestration medium comprises a complexing agent selected from the group consisting of dithiocarbamates and acidic mixtures including dithiol species.

The membrane preferably forms a tube and the sequestration medium is contained within the tube. The tube advantageously comprises a "layflat" (flattened) tube. Preferably, the layflat tube comprises a means for supporting the tube.

The nonporous polymeric membrane preferably comprises a nonporous synthetic polymer selected from the group consisting of polyethylene, polypropylene, silicone, polyvinylchloride, chlorinated polyethylene, chlorosuphonated polyethylenes, polyamides, and polyethylene vinylacetate copolymers. In one advantageous implementation, the membrane comprises a nonporous synthetic polymer laminated with a microporous polymer. For most laboratory applications, the membrane has a thickness of no greater than 100 $\mu$m.

Other features and advantages of the invention will be set forth in, or apparent from, the following detailed description of preferred embodiments of the invention.

DESCRIPTION OF THE PREFERRED EMBODIMENTS

Figure 1:
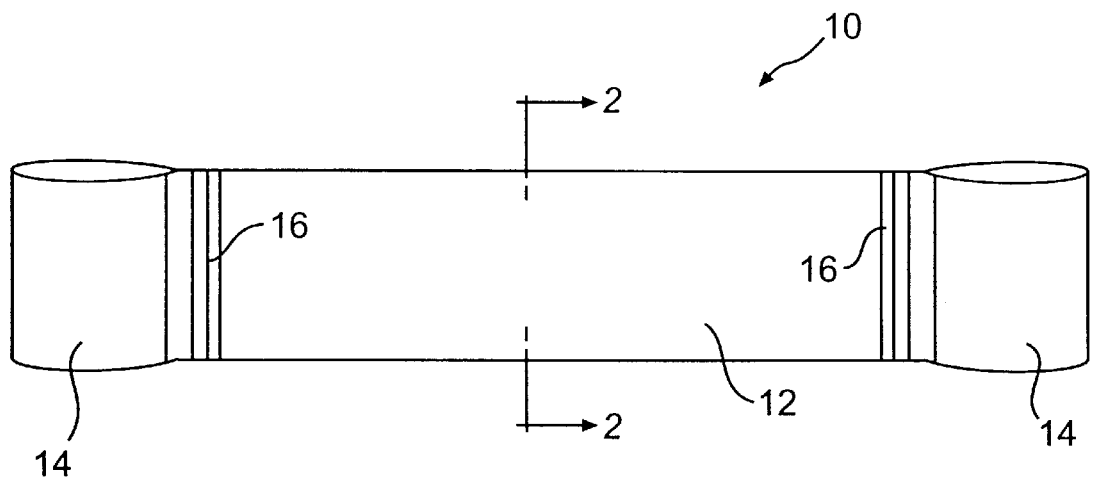
FIG. 1 is front elevational view of a device in accordance in one preferred embodiment of the invention.
Figure 2:
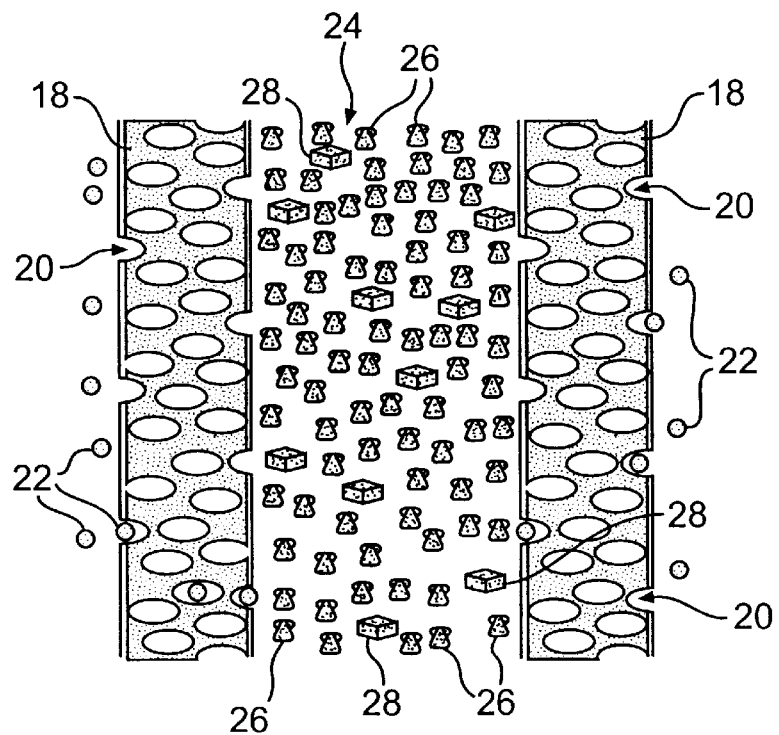
FIG. 2 is a schematic cross sectional view, taken generally along line 2—2 FIG. 1 but drawn to a substantially enlarged scale, depicting, in a representational form, a portion of a cross section of the basic device including the active chemical elements used in this preferred embodiment.

Referring to FIGS. 1 and 2, there is shown a device for sequestering mercury species from air and water constructed, in accordance with one preferred embodiment of the invention. It will, of course, be understood that other embodiments or configurations can be used depending on the application and, in this regard, it is noted that the configuration shown in FIGS. 1 and 2 was designed for integrative sampling of neutral mercury in a laboratory setting and is, in practice, relatively small in scale. The device, which is generally denoted 10, basically comprises a flat or "layflat" tube having tether loops 14 at the opposite ends thereof. The ends are sealed by heat seals 16 adjacent to the tether loops 14. In a specific, non-limiting tube 12 is 15 cm long by 2.54 cm wide, is made of low density layflat polyethylene tubing having a 50 to 100 micron wall (membrane) thickness, and contains about 10 ml of an acidic oxidant inside the tubing.

FIG. 2 is a highly schematic representation of the membrane-acidic oxidant configuration wherein the polymeric membranes forming tube 12 are indicated at 18 and transient cavities ($\leq$10 Å diameter) found in membranes 18 are indicated at 20. An acidic oxidant is contained in a space 24 between membranes 18. Throughout FIG. 2 the mercury (Hg°) is indicated by the "circles" 22, while within the space 24, in the illustrated embodiment, the acidic oxidant comprises nitric acid ($HNO_3$) indicated at 26 augmented by gold ($Au^{+3}$) represented by the "blocks" 28.

More generally, the device of the invention preferably comprises a sealed nonporous polymeric tube containing a reactive medium capable of transforming the neutral mercury species into a non-volatile (stabilized) mercury species which will accumulate in the device. The polymeric tube is preferably made of thin-walled nonporous polyethylene, polypropylene, polyvinyl chloride, silicone, and the like. Alternatively, a thin layer of a nonporous polymer can be grafted or laminated to a thicker microporous polymer such as microporous polypropylene to increase strength and uptake (membrane) rates. Nonporous membranes used in the present invention are characterized by liquid-like and crystalline-regions of the polymer, and have no air filled fixed pores, but rather include transient cavities (corresponding to cavities 20 of FIG. 2) in the liquid-like regions. The size of these transient cavities in nonporous polymers are extremely small (usually $\leq$10 Å in cross sectional diameter as indicated above) and thus the membrane usually limits the rate of chemical uptake. These nonporous polymers are hydrophobic in nature and are virtually nonpermeable to charged or polar species. Consequently, water as either vapor or liquid will not pass through the transient cavities. In contrast, neutral mercury species (corresponding to those indicated schematically at 22 in FIG. 2) are relatively hydrophobic and readily permeate nonporous polymers and make contact with the reactive sequestration phase. It is also important to note that since neutral mercury species are biologically available, the present invention should provide a more realistic estimate of organism exposure to mercury.

The sequestration phase preferably comprises an acidic oxidant capable of rendering the neutral mercury into a soluble ionic form. Such oxidants include nitric acid, either alone, or, as indicated in FIG. 2, augmented with soluble gold (Au) in the +3 valence state, or hydrochloric acid augmented with soluble $Au^{+3}$. Other examples of oxidative sequestration media include mixtures of hydrochloric and nitric acids, potassium permanganate/sulfuric acid mixtures and, in general, any oxidant capable of rendering the neutral mercury species into an soluble ionic mercury species. Alternatively, complexing agents such as dithiocarbamates in combination with $Au^{+3}$ or other complexing agents such as acidic mixtures containing dithiol species can be employed to solublize and concentrate the transformed neutral mercury species. In general, complexing agents capable of forming a stable, non-volatile or non-mobile mercury species can be employed as the sequestration phase in the present invention.

The principal driving force for neutral mercury uptake, when the device (i.e., the polar reactive sequestration phase enclosed in a polymeric hydrophobic membrane) is in contact with air or water containing neutral vapor phase or dissolved mercury species, is the selective permeation of neutral mercury species through the nonporous polymer and transformation of the neutral mobile mercury species by the sequestration phase into a non-mobile soluble ionic or complexed form of mercury. This transformation effectively removes mercury species (by acting as an "infinite sink") from one media (e.g., air and water) and concentrates the transformed species in a second, isolated media. Because of this process, the aforementioned neutral mercury species is concentrated in a linear manner through time. Also, if devices of sufficient size or numbers are exposed to closed or low exchange rate environments, the mercury removal rate should be great enough to lower the overall concentration of neutral mercury species. Based on a 76 cm$^2$, surface area configuration containing 10 mL of 10% nitric acid augmented with 1 ppm $Au^{+3}$, a device according to the invention, concentrated neutral mercury $10^2$–$10^3$ fold higher than in the exposure media (water or air) following seven days. Longer exposure times will result in higher concentration factors above ambient levels. For analytical applications, the uptake of neutral airborne mercury species will be controlled by the membrane and will consequently be proportional to their ambient concentrations. This enables the present invention to integratively sample neutral vapor phase mercury at a constant rate, regardless of air face velocity.

For analytical determination of immobilized mercury residues, recovery and analysis of the transformed neutral mercury species is accomplished using widely recognized standard techniques (i.e., digestion, atomic absorption spectroscopy, inductively coupled plasma mass spectrometry, etc.). Any enrichment procedure or analytical technique applicable to measuring ionic or complexed mercury species is suitable for determining mercury concentrations sequestered in the present invention. However, with the preferred configurations of the invention, no digestion or pre-enrichment procedure would be necessary.

Considering further some of the matters discussed above, there are a wide range of possible configurations and process parameters for sequestration of neutral mercury species from air and water, ranging from small scale (analytical) devices to large industrial or remedial scale devices. As indicated previously, a variety of types of nonporous synthetic polymeric films can theoretically be used for the device. These include: polyethylene, polypropylene, silicone and Silastic®, polyvinylchloride, chlorinated polyethylene, chlorosulphonated polyethylenes, polyimides, polyethylene vinylacetate copolymers, laminates of microporous polymers with these nonporous polymers, and the like. Relatively thin polymeric films of 0.0002 to 0.0196 inches (5 to 500 μm) thickness are generally better suited for all applications because of the need to maximize transport of the neutral mercury species through the membrane into the sequestration media. However, for greater strength, devices to be used for industrial or large scale applications should be constructed of thicker polymeric membranes so as to safely hold larger amounts of the sequestration media.

In most instances, the membrane controls the transport of the neutral mercury species into the sequestration media and will control the time taken to saturate the device. Saturation completes the uptake process and requires replacement by another device or devices if monitoring or cleanup is continued. In general, increasing the film thickness of nonporous polymers to increase the strength of the device reduces permeation or sequestration rates of neutral chemicals through nonporous synthetic polymers. This reduction typically occurs in a linear manner at constant temperature and pressure. A film thickness of $\geq 50$ μm $\leq 100$ μm is generally preferred for small scale ($\leq 100$ mL volume of the sequestration phase) analytical applications of the present invention. However, applications such as the use of large volumes of acidic oxidants enclosed in high surface area polymeric films for removal of neutral mercury from various situations may require the greater strength and durability of the upper range of film thickness, i.e., 100 to 500 μm. In addition, for hydrocarbon polymers such as polyethylene or polypropylene, properties of low density, low crystallinity, and low chain orientation may be desirable because these properties maximize transport of neutral chemicals through the film matrices, effectively enhancing the sequestration of chemicals.

The surface area (polymer film) to volume (enclosed acidic oxidant or complexing media) ratios used for the device of the present invention can vary greatly depending on the nature of the particular application of the device. The larger surface area configurations permit greater total chemical flux into the enclosed sequestration media per unit time, which increases chemical removal rates. Such configurations are advantageous in either analytical or remedial applications. For some large scale or remedial applications, adequate rates of removal of neutral mercury species may require large numbers or long lengths of tubing containing large amounts of the acidic oxidant or complexing agent. In one specific, non-limiting example of a large scale configuration, approximately 2000 mL of 10% nitric acid containing 1 ppm Au is placed in a three meter length of 15 centimeter wide layflat, low density polyethylene tubing having a wall thickness of 0.01 to 0.03 centimeters. The ends of the layflat tubing are heat sealed (as indicated, e.g., at 16 in FIG. 7), secured with large clamps, and the like, and placed in the atmosphere or water of interest. The device so configured can be deployed in multiple single large scale configuration arrays or in cluster arrays. By employing many of these acidic oxidant or complexing agent containing systems, contaminated air or water can be exposed to large amounts of the transformation media so as to provide adequate removal of neutral mercury.

The capacity of the device for removing neutral mercury (i.e., the polymer tube enclosing an acidic oxidant or complexing media) is determined by its sequestration phase volume and the nature of the sequestration medium. For example, after 7 days, neutral vapor-phase mercury was concentrated $6.0 \times 10^3$ times higher in the polyethylene enclosed acidic oxidant (two mL of 10% nitric acid augmented with 1 ppm $Au^{+3}$ in a 7.5 cm×2.54 cm tube) than in the surrounding air.

Based on the amount of gold oxidant, a minimum of 10 $\mu g$ of mercury, per mL of reactive medium, could be sequestered based on the aforementioned experiment. In theory, 300 $m^3$ of air containing 30 $ng/m^3$ could be purified by only one mL of the acidic oxidant contained in polyethylene layflat tubing. Based on the global background of mercury vapor ranging from 1–3 $ng/m^3$, each mL of acidic oxidant in the present invention would purify from 3,000 to 9,000 $m^3$ of air with these mercury levels.

As was described previously, molecular size and polarity are major physicochemical-related factors that limit the transport or uptake rate of mercury species through nonporous polymers. For example, the permeability of small molecular weight organic molecules through polyethylene (at constant temperature and pressure) decreases according to increasing polarity (i.e., approach to ionic state) of functional groups as follows: halogenated hydrocarbons, hydrocarbons, ethers, esters, ketones, aldehydes, nitro-derivatives, alcohol and acids. Consequently, this type of resistance to mass transfer or diffusion reduces the usefulness of very nonpolar polymers such as polyethylene, polypropylene, and the like, for applications dealing with polar chemicals such as phenols, alcohols and organic acids. As the chemical moiety becomes polar enough to be ionic (e.g., $Hg^{+2}$), it will not diffuse through the nonporous hydrophobic polymer and no uptake of such ionic chemicals will occur. However, the use of these polymers to enclose a polar/ionic sequestration media capable of transforming neutral mercury species into ionic or complexed soluble species is an effective approach for removing and concentrating such mercury species, because the ionic sequestration phase will not diffuse outward from the interior of the device and ionic environmental mercury species will not diffuse through the polymer film into the device.

As was also described hereinabove, the cavities (transient openings, indicated at 20 in FIG. 2, resulting from the thermally mediated motions of the polymer chains) in nonporous membranes are about 10 Å in cross sectional diameter. Consequently, the larger the chemical, the more restrictive becomes the permeation path through the polymer film. In the case of mercury vapor, the cross-sectional diameter is only about 3 Å. Therefore, there is little impedance to the diffusion of mercury vapor through the polymer. The diffusion process through the nonporous polymer is typically limited to a molecule by molecule process. Constant diffusion into the sequestration phase, where the transformation into an ionic or complexed soluble species occurs, results in a linear uptake through time. In an experiment with respect to the uptake of neutral vapor phase mercury in a device in accordance with the invention when deployed for 84 days in the ambient atmosphere of an urban setting, the removal and concentration of the neutral vapor phase mercury species was linear for the 84 day deployment and resulted in easily analyzed mercury residues.

Regarding the effects of temperature and pressure on the diffusion of neutral mercury species through nonporous polymers it is instructive to consider the effects of temperature and pressure on the diffusion of small organic molecules (i.e., organic vapors) through these polymers. Briefly, increased temperature will generally result in increased diffusion rates of small neutral organic molecules through a particular polymeric film. It can be inferred from this previous work that, with respect to the present invention, an increase in temperature can be expected to result in an increase in the amount of neutral mercury species sequestered because of larger amounts of mercury in the vapor phase. By analogy, although exceptions have been observed with organic molecules, increased atmospheric pressure can be expected to result in some increase in the permeability of the neutral vapor phase mercury species through nonporous polymers.

Examples of the types of sequestration phases applicable to transformation of neutral mercury species into ionic or complexed soluble species have been set forth above. In a typical configuration of the device of the invention, a 10% nitric acid solution containing 1 ppm of $Au^{+3}$ is employed. As indicated previously, other acid, e.g., hydrochloric acid may also be used. Increased acid strength and/or increased concentrations of gold may be used or decreased acid strength and increased gold concentrations are also applicable. Other examples include potassium permanganate/sulfuric acid mixtures, mixtures of nitric and hydrochloric acids, acidic mixtures of complexing agents such as organic thiols, and ligands such as dithiocarbamate. As set forth hereinbelow, in general, any oxidant or complexing media capable of transforming the neutral mercury species into an ionic or complexed soluble (stabilized) mercury species (i.e., a nonmobile, nonvolatile complex) may be employed. The only constraint is a requirement that the sequestration media not dissolve the nonporous polymer. Because these nonporous hydrophobic polymers are very resistant to attack by acids, bases or organic solvents, this constraint is of limited concern.

Temperature is not a constraint unless the sequestration phase freezes at the temperature of application. Because of the reduced freezing point of aqueous solutions containing acids and ionic species, it is anticipated that temperatures normally encountered in sampling air and water will have no detrimental effect on the present invention.

Turning now to some alternative structural configurations to the specific embodiment illustrated in FIG. 1, these configurations include small or large diameter polymeric tubing, or partly sealed polymeric film sheets, which provide a very large surface area, can be arranged in bundles, arrays, or the like, secured by means of a frame or other deployment arrangement, filled with the appropriate sequestration phase, and subsequently sealed. Thereafter, these configurations can be placed in contaminated air or water systems where the air or water moves or is forced by the arrays and makes intimate contact with the device so as to provide an active sampling regimen for removing and concentrating neutral mercury species. Such an arrangement can be employed for analytical or an industrial remediation scale.

The present invention provides a number of advantages over existing approaches for sequestering neutral mercury species. These include greater simplicity, reliability (i.e., the device of the invention is not prone to mechanical problems or breakdowns), enhanced analytical precision for measurements of neutral mercury residues, improved detection limits for neutral mercury residues, wider applicability especially in remote unattended situations, and great cost savings. In addition, the present invention samples the most biologically available mercury species, thus providing an estimate of organism exposure. To our knowledge, no other vapor phase mercury sampler or monitor provides this specificity. As a result, the present invention provides the best estimate of exposure to vapor phase mercury.

As discussed hereinbefore, the present invention has been demonstrated to be highly efficient and effective for removing and concentrating neutral vapor phase mercury. The present invention is highly advantageous in that the vapor phase mercury is sequestered and transformed in a liquid media that can be easily and directly analyzed by the most widely employed analytical methods. Therefore additional laboratory processing steps, with the accompanying potential for sample contamination and reduced analytical precision, are eliminated. This results in improved potential for lower detection limits especially for laboratories which do not routinely conduct sample preparation and analysis using high-cost clean room conditions and procedures. Further, the invention is more widely applicable to monitoring studies than any other existing approaches primarily because the device has much higher sampling rates (even based on the small 76 $cm^2$ embodiment discussed in connection with FIG. 1), and can be used in an integrative manner for weeks to months due to the transformation of the mercury species into a stabilized ionic or complexed form in the device. The stability of neutral mercury collected by any prior method of which we are aware is much less certain and is often problematic.

Although the present invention has been described relative to specific exemplary embodiments thereof, it will be understood by those skilled in the art that variations and modifications can be effected in these exemplary embodiments without departing from the scope and spirit of the invention.

What is claimed:

1. A device for removing and concentrations neutral mercury species from air and water, said device comprising:
   a nonporous polymeric membrane for capturing the neutral mercury species and
   a sequestration medium enclosed within said membrane, said sequestration medium capable of transforming the neutral mercury species captured by said membrane into a stabilized mercury species.

2. A device as claimed in claim 1 wherein, said sequestration medium comprises an oxidant for transforming the neutral mercury species into a ionic soluble mercury species.

3. A device as claimed in claim 2 wherein said oxidant comprises an acidic oxidant selected from the group consisting of nitric acid, hydrochloric acid, nitric acid and gold mixtures, hydrochloric acid and gold mixtures; potassium permanganate and surfuric acid mixtures, and nitric acid and hydrochloric acid mixtures.

4. A device as claimed in claim 3 wherein said acidic oxidant comprises nitric acid.

5. A device as claimed in claim 2 wherein said oxidant comprises nitric acid augmented with soluble gold in the +3 valence state.

6. A device as claimed in claim 2 wherein said oxidant comprises hydrochloric acid augmented with gold in the +3 valence state.

7. A device as claimed in claim 1 wherein said sequestration medium comprises a complexing agent for transforming the mercury species into a complexed soluble mercury species.

8. A device as claimed in claim 1 wherein said sequestration medium comprises a complexing agent selected from the group consisting of dithiocarbamates and acidic mixtures including dithiol species.

9. A device as claimed in claim 1 wherein the membrane forms a tube and said sequestration media is contained within the tube.

10. A device as claimed in claim 9 wherein said tube comprises a flattened tube.

11. A device as claimed in claim 10 further comprising means for supporting said flattened tube.

12. A device as claimed in claim 9 wherein said nonporous polymeric membrane comprises a nonporous synthetic polymer selected from the group consisting of polyethylene, polypropylene, silicone, polyvinylchloride, chlorinated polyethylene, chlorosuphonated polyethylenes, polyamides, and polyethylene vinylacetate copolymers.

13. A device as claimed in claim 12 wherein membrane comprises a said nonporous synthetic polymer laminated with a microporous polymer.

14. A device as claimed in claim 9 wherein said membrane has a thickness of no greater than 500 $\mu$m.

15. A device as claimed in claim 1 wherein said nitric acid comprises a 10% solution of nitric acid.

16. A device for removing and concentrating neutral mercury species from air and water, said device comprising:
   a nonporous polymeric tube for capturing the neutral mercury species, said tube being comprised of a membrane having a transient cavities therein having average size no greater than 10 Å; and
   a sequestration medium contained within said tube capable of transforming the neutral mercury species captured by said tube into a stabilized mercury species, said sequestration medium comprising a medium selected from the group consisting of acidic oxidants for transforming the neutral mercury species into a ionic soluble mercury species and complexing agents for transforming the mercury species into a complexed soluble mercury species.

17. A device as claimed in claim 16 wherein said sequestration medium comprises an acidic oxidant selected from the group consisting of nitric acid, hydrochloric acid, nitric acid and gold mixtures, hydrochloric acid and gold mixtures; potassium permanganate and surfuric acid mixtures, and nitric acid and hydrochloric acid mixtures.

18. A device as claimed in claim 17 wherein said acidic oxidant comprises nitric acid.

19. A device as claimed in claim 18 wherein said nitric acid comprises a 10% solution of nitric acid.

20. A device as claimed in claim 17 wherein said oxidant comprises hydrochloric acid augmented with gold in the +3 valence state.

21. A device as claimed in claim 16 wherein said acidic oxidant comprises nitric acid augmented with soluble gold in the +3 valence state.

22. A device as claimed in claim 16 wherein said sequestration medium comprises a complexing agent selected from the group consisting of dithiocarbamates and acidic mixtures including dithiol species.

* * * * *

UNITED STATES PATENT AND TRADEMARK OFFICE
CERTIFICATE OF CORRECTION

PATENT NO. : 6,129,843
DATED : October 10, 2000
INVENTOR(S) : Petty, Brumbaugh, Huckins and May It is certified that error appears in the above-identified patent and that said Letters Patent is hereby corrected as shown below:

Title page,
In the title insert "Air" between the words "From" and "And"

Signed and Sealed this

Thirteenth Day of November, 2001

Attest:

*Nicholas P. Godici*

NICHOLAS P. GODICI
*Attesting Officer*     *Acting Director of the United States Patent and Trademark Office*